Nov. 18, 1952        C. G. HUNT        2,618,299
MITER BOX WITH SPRING-PRESSED ROLLER SAW GUIDE
Filed Feb. 4, 1949
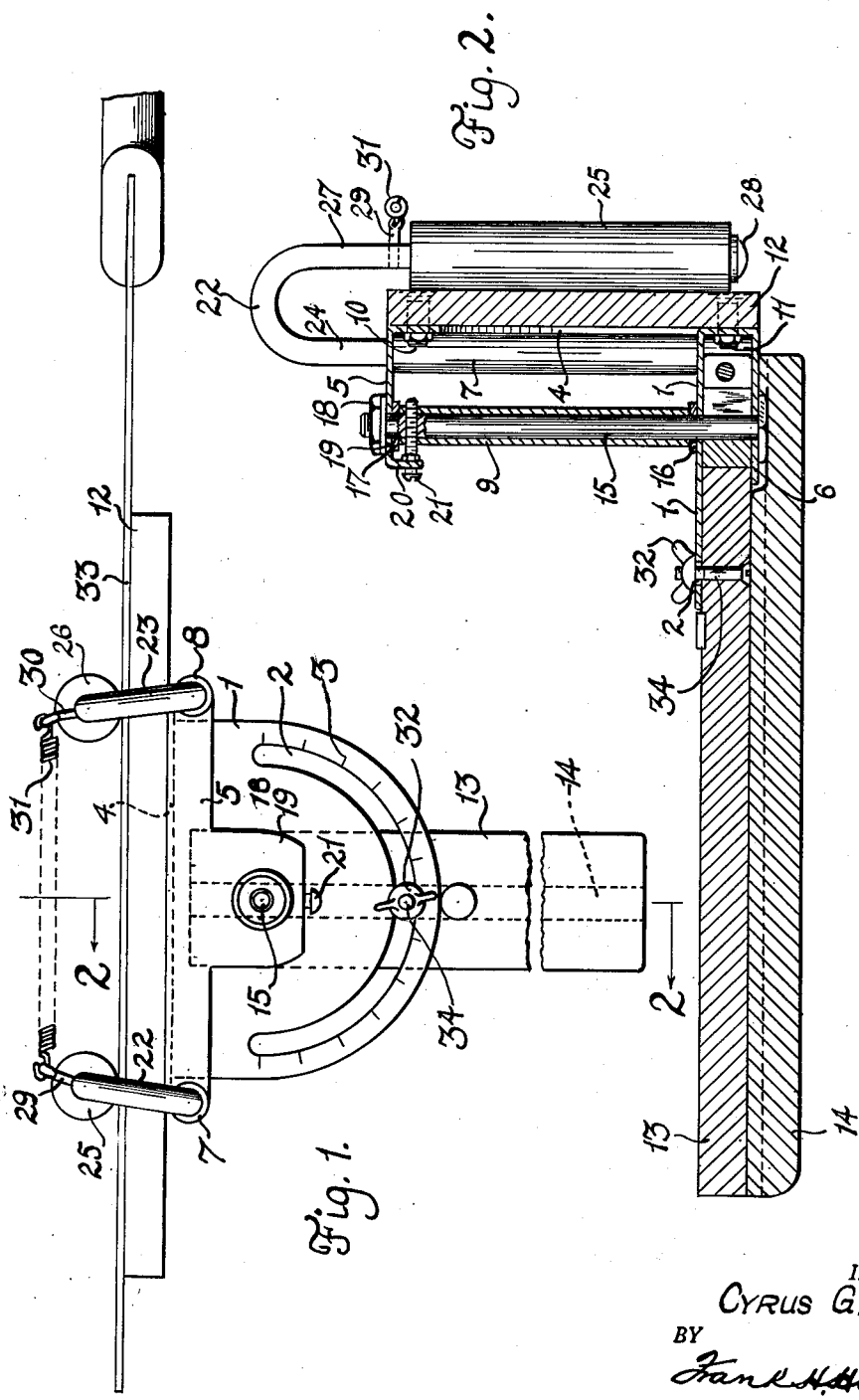
INVENTOR.
Cyrus G. Hunt
BY
Frank H. Harmon
ATTORNEY Patented Nov. 18, 1952

2,618,299

UNITED STATES PATENT OFFICE 2,618,299

MITER BOX WITH SPRING-PRESSED ROLLER SAW GUIDE

Cyrus G. Hunt, Chagrin Falls, Ohio

Application February 4, 1949, Serial No. 74,499

3 Claims. (Cl. 143—87)

1

This invention relates in general to carpenter's tools and more particularly to improvements in miter boxes.

The art of miter boxes, generally speaking, is age old. Generally they comprise a bed plate, a saw guide face plate, an adjustable work engaging arm and a calibrated segment to denote the angle of saw cut. Some even employ a resilient saw guide in the form of a U-shaped leaf spring.

My present invention is primarily directed to improvements in the saw guide for a miter box and one of the primary objects is to provide such a saw guide that automatically adapts itself for different saw thicknesses and automatically insures parallel engagement of the saw face with that of the saw guide plate.

Another object is to provide such a saw guide that resiliently urges the saw face into parallel engagement with that of the saw guide plate.

Another object is to provide a saw guide that employs rollers that are spring urged to engage the outer face of the saw to force the inner face of the saw into parallel engagement with the face of the saw guide plate.

A further object is to use a single spring common to and connected to a plurality of swingable spaced rollers to insure equal roller pressure of the rollers on the saw to provide accurate parallel positioning of the saw against the guide plate throughout the sawing operation.

With the foregoing and other objects in view, the invention resides in the combination of parts and in the details of construction hereinafter set forth in the following specification and appended claims, certain embodiments thereof being illustrated in the accompanying drawings, in which:

Figure 1 is a top plan view of the miter box showing the saw held in parallel engagement with the guide plate by the spring pressed rollers; and Figure 2 is a view in section taken along line 2—2 of the miter box with the saw removed.

Referring more particularly to the drawings, the miter box is shown as including a metal stamping that provides a segment 1 with an arcuate slot 2 and graduated angle scale 3. It also has a back plate 4, an upper flange 5 facing toward the front. In addition, it has two spaced tubular columns 7 and 8. Extending forwardly of flange 5 is an extension flange 19 beneath which is mounted a tubular column 9.

To the back plate 4, by means of such bolts as shown at 10 and 11, is secured a wooden saw guide plate 12.

The swingable arm 13, having a work face engaging central depending flange 14, is pivotally connected to the stamping by means of a bolt 15 which extends upwardly through flange 6, segment 1, a washer 16, tubular column 9, a washer 17 and the upper flange 5 and held in position by a nut 18 on the upper screw threads of bolt 15. As a means of adjustment and maintenance of relative angular disposition of the guide block and support with respect to the work engaging arm, the horizontal extension flange 19 is provided with a bent over vertical flange 20 which, along with tube 9 and bolt 21, is provided with a screw threaded hole to receive an adjustment screw bolt 21 to effect such adjustment.

In order to insure parallelism of the saw face with that of the guide plate 12, I employ a pair of tubular inverted U-shaped members 22 and 23, one leg of each of which is inserted to slidably and rotatably fit in its corresponding tubular column 7 or 8. In Figure 2, leg 24 of member 22 is shown so extending into column 7.

The other leg of each of members 22 and 23 carries its respective roller 25 or 26. In Figure 2, leg 27 is shown with a cylindrical roller 25 loosely and rotatably mounted on and carried by leg 27 and held in place by a suitable screw 28 screwed to the bottom of leg 27 to maintain roller 25 assembled.

The outer legs of each of the members 22 and 23 also carry a rigid hook member 29 and 30, to the hooks of which are releasably connected the opposite ends of a common tension coil spring 31.

In operation, arm 13 is placed on the work with its flange 14 abutting the edge of the work. The remainder of the miter box assembly is then swung laterally about bolt 15 as a pivot until the desired angle cut, as indicated by the graduated scale 3 of the segment 1, is obtained, at which time the wing nut 32 on the bolt 34 riding in the slot 2 is tightened. Bolt 21 is then tightened to prevent relative pivotal movement between the arm 13 and the rest of the assembly.

The saw 33 is then positioned between the two spaced spring pressed rollers 25 and 26 and the guide block 12. Of particular importance are the following features of the guide assembly for the saw. It departs from the old practice of leaving it to the skill of the operator entirely in maintaining the saw parallel with the face of the guide block. It departs from the old practice of miter boxes having a given limited number of angles of saw cut grooves. It also departs from the old practice of a single rigid, or flexible, single point frictional sliding engagement of the guide for the saw which does not insure parallelism.

In the first place, the two spaced rollers effect a spaced two point engagement of the saw to insure parallism of the saw throughout its length with the guide block. Moreover, the presence of the rollers, instead of non-rotatable members, reduces the friction during the sawing operation. Also the fact that a single spring is used, which has its ends connected to the legs in the rollers, insures equal resilient pressure of each roller at spaced points on the saw in the further interest of parallelism in disposition of the saw with respect to the guide block. By reference to Figure 1 it will be seen that the arms 29 and 30 of members 22 and 23 are held at the angle indicated by spring 31 for the thickness of saw 33. The insertion of a saw of greater thickness would cause members 22 and 23 and their hook arms 29 and 30 to pivot, arm 29 counterclockwise and arm 30 clockwise, against the action of spring 31 to accommodate the saw of greater thickness. Moreover, this resilient clamping action of the spring urged rollers is applied uniformly throughout the vertical length of each roller to insure against vertical, as well as lateral, displacement of the saw from absolute parallelism of the saw face with the face of the guide block.

The miter box assembly, besides having the foregoing advantages, is simple and inexpensive in construction and manufacture and is capable of universal use for different purposes, unlimited variations of angle cuts and suitable for accommodating saws of different types, lengths and thicknesses.

I claim:

1. In a miter box having a work engaging arm and a saw guide block and a support therefor adjustably pivoted on said arm, a pair of members pivotally mounted at longitudinally spaced points on said support and each carrying a rolling element, a single tension coil spring the ends of which are connected to said pivoted members to resiliently urge said rolling elements into engagement with the outer face of the saw to maintain the latter in parallelism with the outer face of said guide block.

2. In a miter box having a work engaging arm and a saw guide block and a support therefor adjustably pivoted on said arm, a pair of members pivotally mounted at longitudinally spaced points on said support and each carrying a cylindrical rolling element, a single tension coil spring the ends of which are connected to said pivoted members to resiliently urge said rolling elements into engagement with the outer face of the saw to maintain the latter in parallelism with the outer face of said guide block.

3. In a miter box having a work engaging arm and a saw guide block and a support therefor adjustably pivoted on said arm, a pair of longitudinally spaced columns on said support, a pair of inverted U-shaped members each having its inner leg pivotally carried by one of said columns and the outer leg of each member removably carrying a cylindrical roller, a single tension spring the ends of which are connected to said two outer legs to resiliently urge said rollers into engagement with the outer face of the saw to maintain the inner face of the saw in vertical and longitudinal parallelism with the outer face of said guide block.

CYRUS G. HUNT.

REFERENCES CITED

The following references are of record in the file of this patent:

UNITED STATES PATENTS

| Number | Name | Date |
|---|---|---|
| 851,841 | Schade | Apr. 30, 1907 |
| 876,266 | Cassity | Jan. 7, 1908 |
| 1,442,265 | Grandle | Jan. 16, 1923 |

FOREIGN PATENTS

| Number | Country | Date |
|---|---|---|
| 19,674 | Sweden | July 22, 1905 |